US012623733B2

(12) United States Patent
King et al.

(10) Patent No.: US 12,623,733 B2
(45) Date of Patent: May 12, 2026

(54) LOAD BALANCING SYSTEMS AND METHODS, AND SELF-BALANCING TRAILERS

(71) Applicant: STREAM IT, INC., Austin, TX (US)

(72) Inventors: Lance M. King, Austin, TX (US); Zach Radkey-Pechacek, Austin, TX (US); Nathan Swanson, Austin, TX (US); Timothy Wulff, Austin, TX (US)

(73) Assignee: STREAM IT, INC., Austin, TX (US)

( * ) Notice: Subject to any disclaimer, the term of this patent is extended or adjusted under 35 U.S.C. 154(b) by 0 days.

(21) Appl. No.: 18/137,821

(22) Filed: Apr. 21, 2023

(65) Prior Publication Data

US 2023/0339555 A1 Oct. 26, 2023

Related U.S. Application Data

(60) Provisional application No. 63/334,049, filed on Apr. 22, 2022, provisional application No. 63/334,055, filed on Apr. 22, 2022.

(51) Int. Cl.
| | |
|---|---|
| *B62D 21/20* | (2006.01) |
| *B62D 37/04* | (2006.01) |
| *B62D 63/06* | (2006.01) |

(52) U.S. Cl.
CPC .................................. *B62D 37/04* (2013.01)

(58) Field of Classification Search
CPC ........ B62D 21/20; B62D 37/04; B62D 63/06; B62D 21/14; B60G 2300/04; B60G 2300/40; B60G 2300/50
USPC ....................................................... 280/789
See application file for complete search history.

(56) References Cited

U.S. PATENT DOCUMENTS

| | | | |
|---|---|---|---|
| 6,240,339 | B1 * | 5/2001 | von Mayenburg .......................... B60G 17/0523 701/72 |
| 11,607,918 | B2 * | 3/2023 | Goodarzi ........... B62D 53/0864 |
| 2015/0259185 | A1 * | 9/2015 | Ditty ..................... B66F 11/046 182/19 |
| 2016/0234992 | A1 * | 8/2016 | Clifford .............. B60B 35/1036 |

(Continued)

FOREIGN PATENT DOCUMENTS

| | | | | |
|---|---|---|---|---|
| DE | 29724805 | U1 * | 7/2004 | ......... B60G 17/0152 |
| DE | 102005035379 | A1 * | 12/2006 | ............ B60P 1/6481 |
| FR | 2714653 | A1 * | 7/1995 | ............ B60P 3/1033 |

OTHER PUBLICATIONS

Description Translation for DE 102005035379 from Espacenet (Year: 2005).*

(Continued)

*Primary Examiner* — Jason D Shanske
*Assistant Examiner* — Daniel M. Keck
(74) *Attorney, Agent, or Firm* — Buchalter LLP

(57) ABSTRACT

Load balancing systems and methods, and trailers with components for load balancing across the trailers or portions (e.g., axles, springs, frame portions) thereof are provided herein. Some trailers comprise a frame, a suspension system configured to support the frame on a set of axles comprising a first axle, and wherein the first axle is movably coupled to the frame. Some trailers comprise a frame, a piping system coupled to the frame, and a set of tanks coupled to one another via the piping system. The piping system can comprise a set of pumps configured to pump fluid between the tanks for load balancing.

11 Claims, 5 Drawing Sheets

(56) References Cited

U.S. PATENT DOCUMENTS

| 2023/0328490 | A1 | 10/2023 | Brinkman et al. |
| 2024/0246610 | A1* | 7/2024 | Galazin ................. B60G 11/04 |

OTHER PUBLICATIONS

Lopez, J., GM Files Patent for Tow Assist System, GM Authority, Mar. 25, 2023, 4 pgs., [online] URL: https://gmauthority.com/blog/2023/03/gm-files-patent-for-tow-assist-system/.

* cited by examiner

LOAD BALANCING SYSTEMS AND METHODS, AND SELF-BALANCING TRAILERS

CROSS-REFERENCE TO RELATED APPLICATIONS

This application claims priority to U.S. Provisional Patent Application Ser. Nos. 63/334,049, filed on Apr. 22, 2022, and 63/334,055, filed on Apr. 22, 2022. These and all other extrinsic materials discussed herein, including publications, patent applications, and patents, are incorporated by reference in their entirety. Where a definition or use of a term in an incorporated reference is inconsistent or contrary to the definition of that term provided herein, the definition of that term provided herein applies and the definition of the term in the reference does not apply.

FIELD OF THE INVENTION

The field of the invention is load balancing systems and methods, and self-balancing trailers.

BACKGROUND

An unbalanced/uneven load on a trailer can cause extra movement, making it more difficult to control the trailer and tow vehicle the trailer is attached to, putting extra strain on the trailer and/or tow vehicle suspension components and axles, and/or causing fish-tailing/loss of control resulting in accidents.

SUMMARY

It is critically important to properly balance the load of the trailer, or the load will become unstable and begin to sway which can roll both the trailer and the vehicle towing it (the tow vehicle). Various systems and methods for balancing a load of a trailer are provided herein.

In an aspect of the disclosure, a trailer is provided, comprising a frame, a suspension system configured to support the frame on a set of axles comprising a first axle, and wherein the first axle is movably coupled to the frame. In some embodiments, the set of axles further comprises a second axle coupled to the frame. In some embodiments, the second axle is movably coupled to the frame. In some embodiments, the first axle is configured to move at least 1 foot, at least 2 feet, at least 3 feet, at least 4 feet, or even at least 5 feet or more in any suitable direction (e.g., forward, rearward, sideways to left or right, diagonally) is a straight or curved manner relative to the frame. In some embodiments, the first axle and second axle are coupled to the frame such that a distance between a mid-point of the first axle and a mid-point of the second axle can be modified by at least 1 foot, at least 2 feet, at least 3 feet, at least 4 feet, or even at least 5 feet or more in any suitable direction. In some embodiments, the distance can be modified while the trailer is coupled to a moving tow vehicle. In some embodiments, the distance can be modified while the trailer is parked. In some embodiments, the suspension system comprises a first spring (e.g., a leaf spring, a coil spring, a coil over spring, a lowering spring), wherein the first axle is movably coupled to the frame via the first spring, wherein a first portion of the first spring is coupled to the first axle via a first bracket, and wherein the second portion of the first spring is coupled to a second bracket that is movably coupled to the frame, for example to a track coupled to the frame. In some embodiments, the trailer further comprises an upper sized and dimensioned to support cargo (e.g., a nonautomotive vehicle, transport container, a housing, a vehicle designed to serve as a temporary dwelling or place of business that are configured to be towed by a vehicle, a flat bed), and wherein the first axle is configured to move based at least in part on a distribution of a weight of the cargo on the first and second axles. In some embodiments, an actuator is coupled to the frame and the first axle, and configured to move the first axle relative to the frame. In some embodiments, a second is coupled to the frame and the second axle, and configured to move the second axle relative to the frame. Any suitable actuator for moving one component relative to another component is contemplated, including, for example, pneumatic actuators, hydraulic actuators, electric actuators, and linear actuators, which are now known or later discovered. In some embodiments, the first axle is coupled to first and second wheels, and wherein the first and second wheels are steerable. In some embodiments, the first and second axles are moving axles (relative to the frame) and are configured to move relative to the frame based at least in part on a change in a load distribution. In some embodiments, one or more actuators of the vehicle can be actuated via any suitable power source, electric, pneumatic and/or hydraulic sources, to achieve physical movement, for example, to adjust a position of an axle relative to a frame. Some contemplated actuators can operate using at least one of a motor and a mechanical drive mechanism.

In an aspect of the disclosure, a load balancing system is provided, comprising a trailer, one or more sensors coupled to the trailer and configured to detect sensor data, and a controller comprising (a) one or more processors, and (b) a memory storing software instructions that, when executed by the one or more processors, cause the one or more processors to obtain the sensor data from the one or more sensors, identify a change in a load associated with the trailer based at least in part on the sensor data, and cause an adjustment of the trailer based at least in part on the sensor data. In some embodiments, the software instructions, when executed by the one or more processors, cause the one or more processors to cause an adjustment of the trailer based at least in part on the sensor data and data stored in one or more databases/memory, for example, any suitable data, including load data, weight data, distribution data, threshold data, suspension height data, historic data (e.g., historic sensor data), deflection of frame data, ride height data, and/or any other suitable data. The sensors can obtain the weight data and balance data either directly or indirectly. For example, position or height sensors can determine the weight by how much the suspension system is compressed by the load. If the suspension is compressed more in the rear than the front, then the rear is carrying a heavier load and the load is rear-biased. Sensors, like accelerometers, might deduce the weight and balance based on the forces they sense when the trailer hits bumps. In some embodiments, the trailer comprises a frame, a suspension system configured to support the frame on a set of axles comprising a first axle, and wherein the first axle is movably coupled to the frame. In some embodiments, the set of axles further comprises a second axle coupled to the frame. In some embodiments, the second axle is movably coupled to the frame. In some embodiments, the first axle is configured to move at least 1 foot, at least 2 feet, at least 3 feet, at least 4 feet, or even at least 5 feet or more in any suitable direction (e.g., forward, rearward, sideways to left or right, diagonally) is a straight or curved manner relative to the frame. In some embodiments, the first axle and second axle and coupled to the frame such that a distance between a mid-point of the first axle and a mid-point of the second axle can be modified by at least 1 foot, at least 2 feet, at least 3 feet, at least 4 feet, or even at least 5 feet or more in any suitable direction. In some embodiments there are no axles because the wheels have independent drive units or the wheels simply are not connected via axles. In some embodiments, the distance can be modified while the trailer is coupled to a moving tow vehicle. In some embodiments, the distance can be modified while the trailer is parked. In some embodiments, the suspension system comprises a first spring, wherein the first axle is movably coupled to the frame via the first spring, wherein a first portion of the first spring is coupled to the first axle via a first bracket, and wherein the second portion of the first spring is coupled to a second bracket that is movably coupled to the frame. In some embodiments, the trailer further comprises an upper sized and dimensioned to support cargo, and wherein the first axle is configured to move based at least in part on a distribution of a weight of the cargo on the first and second axles. In some embodiments, an actuator is coupled to the frame and the first axle, and configured to move the first axle relative to the frame. Any suitable actuator for moving one component relative to another component is contemplated, including, for example, pneumatic actuators, hydraulic actuators, electric actuators, and linear actuators. In some embodiments, the first axle is coupled to first and second wheels, and the first and second wheels are steerable. In some embodiments, the first and second axles are moving axles (relative to the frame) and are configured to move relative to the frame based at least in part on a change in a load distribution detected based at least in part on sensor data. In some embodiments, causing an adjustment comprises causing at least one actuator to move at least one of the first axle and the second axle relative to the frame based at least in part on the sensor data. In some embodiments, one or more actuators of the vehicle can be actuated via any suitable power source, electric, pneumatic and/or hydraulic sources, to achieve physical movement, for example, to adjust a position of an axle relative to a frame. For example, some contemplated actuators can operate using at least one of a motor and a mechanical drive mechanism. In some embodiments, causing an adjustment comprises adjusting a control signal (e.g., electric current, hydraulic pressure, pneumatic pressure) that the actuator converts into mechanical motion. In some embodiments, causing an adjustment can comprise causing a notification associated with at least one of the sensor data and a load of the trailer to be sent to a computing device (e.g., via text, email, display of a computing device). In some embodiments, the notification can be presented to a user via a user interface of a computing device positioned in a tow vehicle, or any other computing device (e.g., a mobile phone, tablet or computer). The computing device can comprise the user interface, one or more processors coupled to the user interface, and one or more software modules configured to, when executed by the one or more processors, present, via the user interface, a notification associated with the sensor data, and receive one or more inputs associated with a desired action (e.g., an adjustment to an axle and/or wheel). The computing device can be configured to receive inputs from a user, and transmit an instruction and/or other data to the controller.

In another aspect, a trailer is provided comprising a frame, a suspension system configured to support the frame on a set of wheels comprising a first, second and third wheel, and wherein at least the first wheel is movably coupled to the frame. In some embodiments, the second wheel is movably coupled to the frame. In some embodiments, the third wheel is movably coupled to the frame. In some embodiments, the first wheel is configured to move at least 1 foot, at least 2 feet, at least 3 feet, at least 4 feet, or even at least 5 feet or more in any suitable direction (e.g., forward, rearward, sideways to left or right, diagonally) is a straight or curved manner relative to the frame. In some embodiments, an actuator is coupled to the frame and the first wheel, and configured to move the first wheel relative to the frame. In some embodiments, a second actuator is coupled to the frame and the second wheel, and configured to move the second wheel relative to the frame. In some embodiments, a third actuator is coupled to the frame and the third wheel, and configured to move the third wheel relative to the frame. Any suitable actuator for moving one component relative to another component is contemplated, including, for example, pneumatic actuators, hydraulic actuators, electric actuators, and linear actuators. In some embodiments, the wheels are steerable. In some embodiments, the first, second and/or third wheels are configured to move relative to the frame based at least in part on a change in a load distribution. In an aspect of the disclosure, a load balancing system is provided, comprising a trailer, one or more sensors coupled to the trailer and configured to detect sensor data associated with the trailer, a controller comprising one or more processors, and a memory storing software instructions that, when executed by the one or more processors, cause the one or more processors to obtain the sensor data from the one or more sensors, identify at least one of an unbalanced load and a change in a load associated with the trailer based at least in part on the sensor data, and cause an adjustment of the trailer based at least in part on the sensor data. In some embodiments, causing an adjustment comprises causing at least one of the first, second and third wheels to move relative to the frame. In some embodiments, causing an adjustment comprising causing one or more actuators to move at least one of the first, second and third wheels relative to the frame. In some embodiments, causing an adjustment can comprise causing a notification associated with at least one of the sensor data and a load of the trailer to be sent to a computing device (e.g., via text, email, display of a computing device). In some embodiments, the notification can be presented to a user via a user interface of a computing device positioned in a tow vehicle, or any other computing device (e.g., a mobile phone, tablet or computer). The computing device can comprise the user interface, one or more processors coupled to the user interface, and one or more software modules configured to, when executed by the one or more processors, present, via the user interface, a notification associated with the sensor data, and receive one or more inputs associated with a desired action (e.g., an adjustment to an axle and/or wheel). The computing device can be configured to receive inputs from a user, and transmit an instruction and/or other data to the controller.

In an aspect of the disclosure, a trailer is provided comprising a frame, a piping system coupled to the frame, and a first fluid tank fluidly coupled to a second fluid tank via at least a first pipe of the piping system. In some embodiments, the piping system comprises a first pump configured to pump a first fluid from the first fluid tank to the second fluid tank via at least the first pipe. In some embodiments, the first pump is further configured to pump a second fluid from the second fluid tank to the first fluid tank via at least the first pipe. In some embodiments, the trailer further comprises a third fluid tank fluidly coupled to a fourth fluid tank via at least a second pipe of the piping system. In some embodiments, a second pump is configured to pump a third fluid from the third tank to the fourth tank via at least the second pipe. In some embodiments, the second pump is configured to pump a fourth fluid from the fourth tank to the third tank via at least the second pipe. In some embodiments, the piping system can comprise any suitable number of pipes, pumps, valves, and/or other components. In some embodiments, multiple piping systems can be provided. In some embodiments, any suitable number of fluid tanks can be provided, and each fluid tank can be fluidly coupled to one, two, or several fluid tanks via one or more pipes of a piping system. In some embodiments, a tank can be coupled to two or more other tanks, and a pump can pump fluid from the first tank to the two or more other tanks (sequentially—for example, with an adjustment of valves; or at the same time). The pumps described herein can comprise any suitable pumps now known or later discovered.

In an aspect of the disclosure, a load balancing system is provided, comprising a trailer, one or more sensors coupled to the trailer and configured to detect sensor data associated with the trailer, a controller comprising one or more processors, and a memory storing software instructions that, when executed by the one or more processors, cause the one or more processors to obtain the sensor data from the one or more sensors, identify at least one of an unbalanced load and a change in a load associated with the trailer based at least in part on the sensor data, and cause an adjustment related to the trailer. In some embodiments, the trailer comprises a frame, a piping system coupled to the frame, and a first fluid tank fluidly coupled to a second fluid tank via at least a first pipe of the piping system. In some embodiments, the piping system comprises a first pump configured to pump a first fluid from the first fluid tank to the second fluid tank via at least the first pipe. In some embodiments, the first pump is further configured to pump a second fluid from the second fluid tank to the first fluid tank via at least the first pipe. In some embodiments, the trailer further comprises a third fluid tank fluidly coupled to a fourth fluid tank via at least a second pipe of the piping system. In some embodiments, a second pump is configured to pump a third fluid from the third tank to the fourth tank via at least the second pipe. In some embodiments, the second pump is configured to pump a fourth fluid from the fourth tank to the third tank via at least the second pipe. In some embodiments, the piping system can comprise any suitable number of pipes, pumps, valves, and/or other components. In some embodiments, multiple piping systems can be provided. In some embodiments, any suitable number of fluid tanks can be provided, and each fluid tank can be fluidly coupled to one, two, or several fluid tanks via one or more pipes of a piping system. In some embodiments, a tank can be coupled to two or more other tanks, and a pump can pump fluid from the first tank to the two or more other tanks (sequentially—for example, with an adjustment of valves; or at the same time). In some embodiments, causing an adjustment comprises causing an adjustment relating to fluid distribution among the first, second, third, and/or fourth fluid tanks of the trailer. In some embodiments, causing an adjustment comprises causing a pump to pump fluid from the first fluid tank to the second fluid tank based at least in part on the sensor data. In some embodiments, causing an adjustment comprises causing a pump to pump fluid from the second fluid tank to the first fluid tank based at least in part on the sensor data. In some embodiments, causing an adjustment comprises causing a pump to pump fluid from the third fluid tank to the fourth fluid tank based at least in part on the sensor data. In some embodiments, causing an adjustment comprises causing a pump to pump fluid from the fourth fluid tank to the third fluid tank based at least in part on the sensor data. In some embodiments, causing an adjustment can comprise causing a notification associated with at least one of the sensor data and a load of the trailer to be sent (e.g., via text, email, display of a computing device). In some embodiments, the notification can be presented to a user via a user interface of a computing device positioned in a tow vehicle, or any other computing device (e.g., a mobile phone, tablet or computer). The computing device can be comprise the user interface, one or more processors coupled to the user interface, and one or more software modules configured to, when executed by the one or more processors, present, via the user interface, a notification associated with the sensor data, and/or receive one or more inputs associated with a desired action (e.g., an adjustment to a valve and/or a pump). In some embodiments, the computing device can transmit instructions to the controller (e.g., for an adjustment).

In an aspect of the disclosure, a load balancing system for a trailer having a piping system including a first pump and a first pipe fluidly coupling a first fluid tank and a second fluid tank. The system can comprise at least one sensor configured to detect sensor data associated with at least one of a load, a weight, a tension, a compression and a pressure associated with the trailer, a wired or wireless interface, and at least one processor configured to perform instructions, the instructions configured to cause the at least one processor to receive the sensor data, determine whether the sensor data is indicative of an unbalanced load, and upon determining the sensor data is indicative of the unbalanced load, at least one of: cause the pump to pump a first fluid from one tank to another tank (e.g., the first tank to the second tank), transmit to at least one of a platform, an external system and a user system, via the communication interface, at least one of the sensor data and a notification associated with the sensor data (e.g., an alert notifying a driver of a tow vehicle of an unbalanced and/or dangerous load distribution—via text, email, display of a computing device), and/or cause a fluid valve coupled to at least one pipe to adjust.

In an aspect of the disclosure, a load balancing system is provided for a trailer having a frame, a suspension system configured to support the frame on a set of axles comprising a first axle movably coupled to the frame via an actuator. The system can comprise at least one sensor configured to detect sensor data associated with at least one of a load, a weight, a tension, a compression and a pressure associated with the trailer, a wired or wireless communication interface, and at least one processor configured to perform instructions, the instructions configured to cause the at least one processor to: receive the sensor data, determine whether the sensor data is indicative of an unbalanced load, upon determining the sensor data is indicative of the unbalanced load, at least one of: cause an axle to move relative to the frame, cause an actuator to move an axle relative to the frame, and transmit to at least one of a platform, an external system and a user system, via a communication interface, at least one of the sensor data and a notification associated with the sensor data (e.g., via text, email, display or a computing device, a sound).

The sensors described herein can comprise any suitable sensor(s), including for example, a force sensor for detecting and/or measuring a force acting on an object (e.g., a suspension component such as a spring, an axle, a portion of an axle or spring or other component), and/or a weight sensor for detecting and/or measuring force and/or load data associated with an object (e.g., a suspension component such as a spring, an axle, a portion of an axle or spring or other component).

Other advantages and benefits of the disclosed system and methods will be apparent to one of ordinary skill with a review of the following detailed description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

Figure 1:
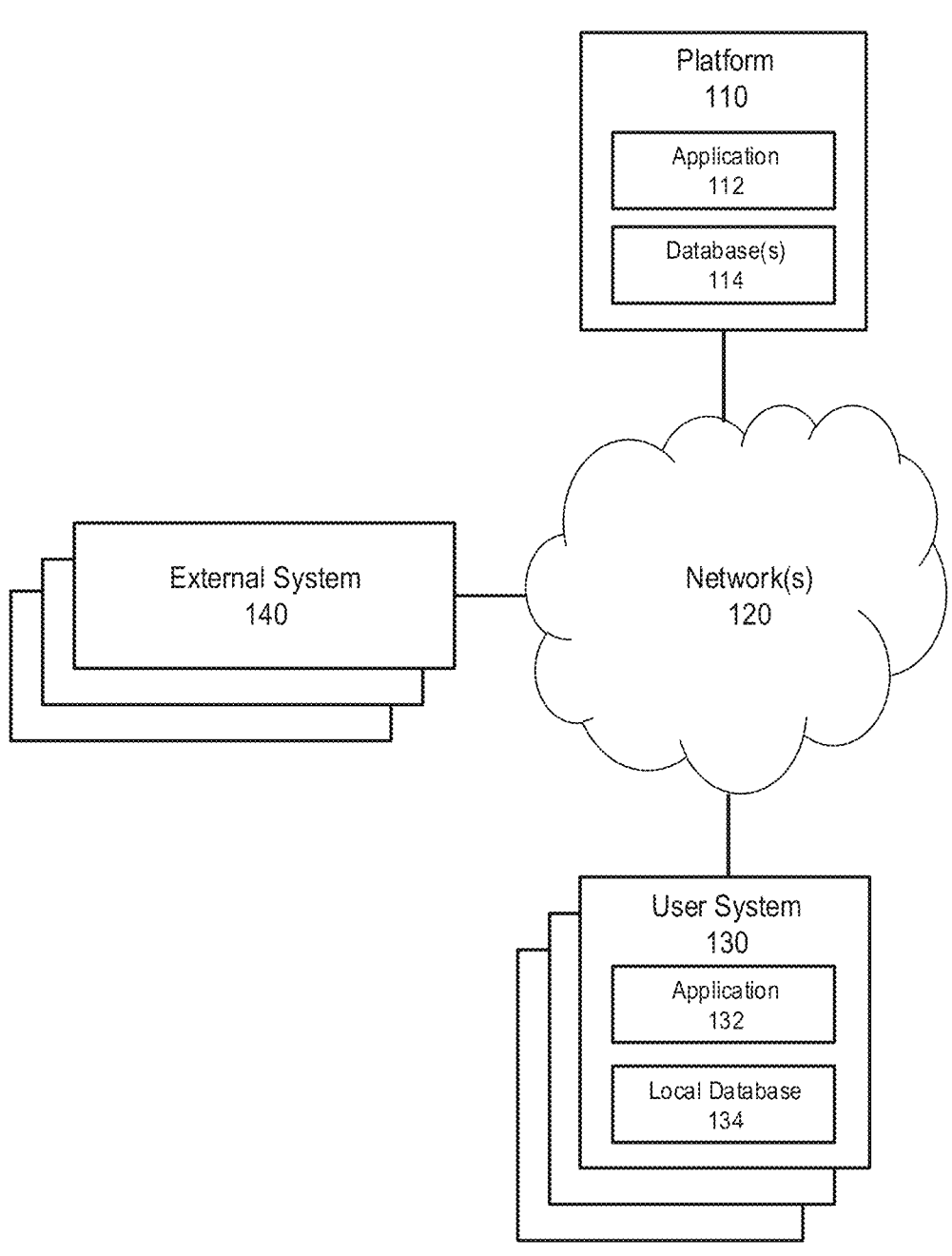
FIG. 1 illustrates an example infrastructure, in which one or more of the processes described herein, may be implemented, according to an embodiment.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims. In some instances, well-known structures and components are shown in simplified form for brevity of description. Some of the surfaces have been left out or exaggerated for clarity and ease of explanation.

In some aspects, a self-balancing trailer (e.g., nonautomotive vehicle, transport container, vehicle designed to serve as a temporary dwelling or place of business that are configured to be towed by a vehicle) is provided, which can be hitched (connected) to a tow vehicle (e.g., a vehicle, an electric vehicle, an automotive vehicle). Known traditional trailers do not have a way to self-balance their load, making them more difficult to drive and less safe compared to a trailer with a balanced load, for example, because bumps, undulations or wind can produce a sway motion that can result in the trailer or tow vehicle losing control or rolling over. There are ways that people can pack their trailers in an attempt to balance the load, but the loads are changing on trips/in a dynamic state. Some have attempted to balance the load of a trailer by adding heavy weights underneath the trailer, and moving those weights forwards or backwards, which can help fore/aft balance, but not side-to-side balance. However, the added mass results in an undesirable reduction in efficiency and range of the tow vehicle.

In an aspect of the disclosure, a self-balancing trailer is provided, comprising two axles coupled to a frame (also referred to herein as chassis) of a trailer, at least one of which is movably coupled to the frame. It should be appreciated that when two physical components are described herein as being "coupled to" one another, such term is intended to include both direct coupling (in which two elements that are coupled to each other contact each other) and indirect coupling (in which at least one additional element is between the two elements) unless the context dictates otherwise. In some embodiments, each movable axle can be indirectly coupled to the frame, for example, via one or more springs of a suspension, via one or more brackets movably coupled to the frame and/or axle, and/or via any component of a suspension system movably coupled to the frame. In some embodiments, a spring (e.g., leaf spring, coil spring) of a suspension can be attached and/or coupled to a movable axle by a first bracket (e.g., a U-bolt bracket), and attached and/or coupled to the frame via a second bracket. It is contemplated that the bracket can move relative to the frame, for example, within a limited range. The suspension can comprise any suitable system of components (such as springs, shock absorbers) supporting the upper part of a trailer (e.g., frame and/or housing) on the axle(s).

In some embodiments, the movable axles can be coupled to one or more wheels (e.g., two wheels, one on each end portion of the axle). In some embodiments, the movable axles can be configured to move dynamically and/or statically. In some embodiments, the movable axles can be configured to automatically adjust based on a shift or change in a trailer load. In some embodiments, two axles (or any other suitable number of axles) with one or more wheels are configured to move (e.g., forwards or backwards) to balance the load of the trailer. This, in essence, can create a wider (or multiple) fulcrum point(s). In some embodiments, one or more of the movable axles can be configured to move left to right, right to left, forward to backward, backward to forward, diagonally, or in any other suitable direction(s) to balance the load of the trailer.

While the disclosure herein generally refers to movable axles, it should be appreciated that self-balancing trailers comprising a set of wheels (e.g., at least 3 wheels) without axles are also contemplated. For example, at least one wheel can be movably coupled to a portion of the frame (e.g., forwards and backwards, right and left, diagonally, and/or in any suitable direction(s)).

The movement of the axle(s) and/or wheel(s) can be accomplished in any suitable manner, for example, by using one or more linear actuators to move the suspension system (or portion thereof) and axle (or portion thereof) along a linear path. In some embodiments, the suspension and axle(s) could be coupled to the linear actuator's carriage. If more than one linear actuator is used, it is contemplated that the second (or other additional) linear actuator(s) could be synchronized to move the suspension and axle(s) and/or wheel(s) forward or rearward to achieve optimal or improved balance. The axle(s) and/or wheel(s) can be configured to move any suitable amount in a forward, rearward, sideways, and/or other direction(s). For example, it is contemplated that an axle and/or wheel can move from a first position to a second position relative to the frame in any direction (e.g., forwards, rearward, left, right, diagonal), wherein a distance between the first and second positions is between 1-25 inches, between 1-18 inches, between 1-12 inches, at least 3 inches, at least 6 inches, at least 9 inches, at least 12 inches, at least 18 inches, no more than 25 inches, no more than 18 inches, no more than 12 inches, and/or no more than 6 inches. Viewed from another perspective, it is contemplated that a mid-point of the axle can move from a first position to a second position relative to the frame in any direction, wherein a distance between the first and second positions is between 1-25 inches, between 1-18 inches, between 1-12 inches, at least 3 inches, at least 6 inches, at least 9 inches, at least 12 inches, at least 18 inches, no more than 25 inches, no more than 18 inches, no more than 12 inches, and/or no more than 6 inches. Viewed from another perspective, it is contemplated that the axle can be coupled to a bracket movably coupled to the frame, wherein the bracket is configured to move between a portion of the frame having first and second ends spaced apart between 1-25 inches, between 1-18 inches, between 1-12 inches, at least 3 inches, at least 6 inches, at least 9 inches, at least 12 inches, at least 18 inches, no more than 25 inches, no more than 18 inches, no more than 12 inches, and/or no more than 6 inches. The first and second end portions of the frame portion can include one or more stops to prevent the bracket from moving beyond the first and second ends.

Figure 3:
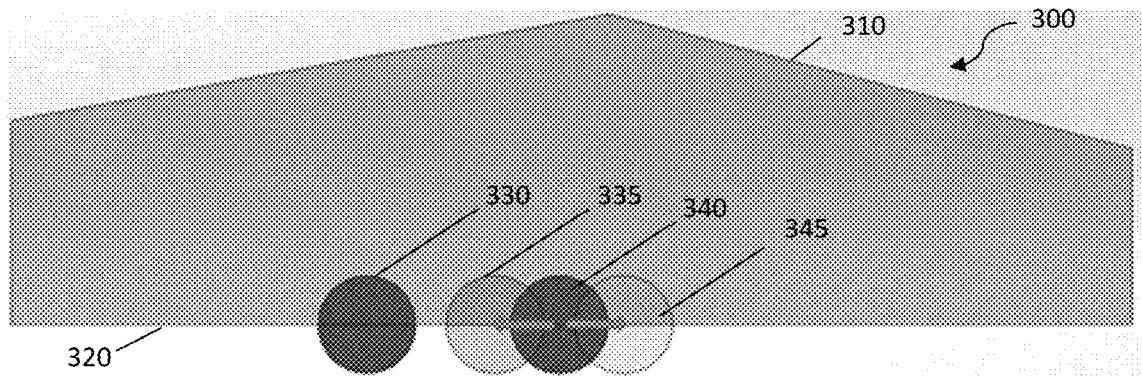
FIG. 3 illustrates an example self-balancing trailer, according to an embodiment.

FIG. 3 illustrates a self-balancing trailer 300, according to an embodiment of the disclosure. Trailer 300 comprises an upper 310 coupled to a frame/chassis 320. A set of wheels (here, wheels 330, 335, 340, 345) are coupled to the frame/chassis 320. It should be appreciated that trailers of the disclosure can comprise any suitable number of wheels. Two or more wheels can be coupled to different portions (e.g., opposite ends) of an axle. Here, two wheels 330 and 335 are coupled to one another via an axle, and two wheels 340 and 345 are coupled to one another via an axle. One or both axles is movably coupled to frame 320, for example, via components of the suspension system.

In another aspect of the disclosure, a self-balancing trailer can comprise an upper (e.g., a platform or flat bed, a housing, a container) that is movably coupled to a frame of the trailer. The upper could move fore or aft along the frame via any suitable mechanism, including for example, hydraulics rams/jacks, compressed air rams/springs, hydraulic cylinders, pneumatic cylinders, and/or electric motors employing a rack and pinion or linear actuator or other mechanical method to move the upper along the frame which can be attached via rail. In this way, the entire upper could move forward or backwards (or in other suitable direction(s)) upon/relative to the frame until balance is improved and/or achieved. In such embodiments, where the bulk of the trailer's weight is movable relative to the frame, it is contemplated that even a slight movement could shift a substantial amount of weight. The upper can be configured to move any suitable amount in a forward, rearward, sideways, and/or other direction(s). For example, it is contemplated that the upper can move from a first position to a second position relative to the frame in any direction (e.g., forwards, rearward, left, right, diagonal), wherein a distance between the first and second positions is between 1-25 inches, between 1-18 inches, between 1-12 inches, at least 3 inches, at least 6 inches, at least 9 inches, at least 12 inches, at least 18 inches, no more than 25 inches, no more than 18 inches, no more than 12 inches, no more than 8 inches, no more than 6 inches and/or no more than 5 inches in any direction (e.g., forwards, rearward, left, right, diagonal). Viewed from another perspective, it is contemplated that a mid-point of the upper can move from a first position to a second position relative to the frame in any direction, wherein a distance between the first and second positions is between 1-25 inches, between 1-18 inches, between 1-12 inches, at least 3 inches, at least 6 inches, at least 9 inches, at least 12 inches, at least 18 inches, no more than 25 inches, no more than 18 inches, no more than 12 inches, and/or no more than 6 inches. Viewed from another perspective, it is contemplated that a corner of the upper can move from a first position to a second position relative to the frame in any direction, wherein a distance between the first and second positions is between 1-25 inches, between 1-18 inches, between 1-12 inches, at least 3 inches, at least 6 inches, at least 9 inches, at least 12 inches, at least 18 inches, no more than 25 inches, no more than 18 inches, no more than 12 inches, and/or no more than 6 inches in any direction.

Figure 7:
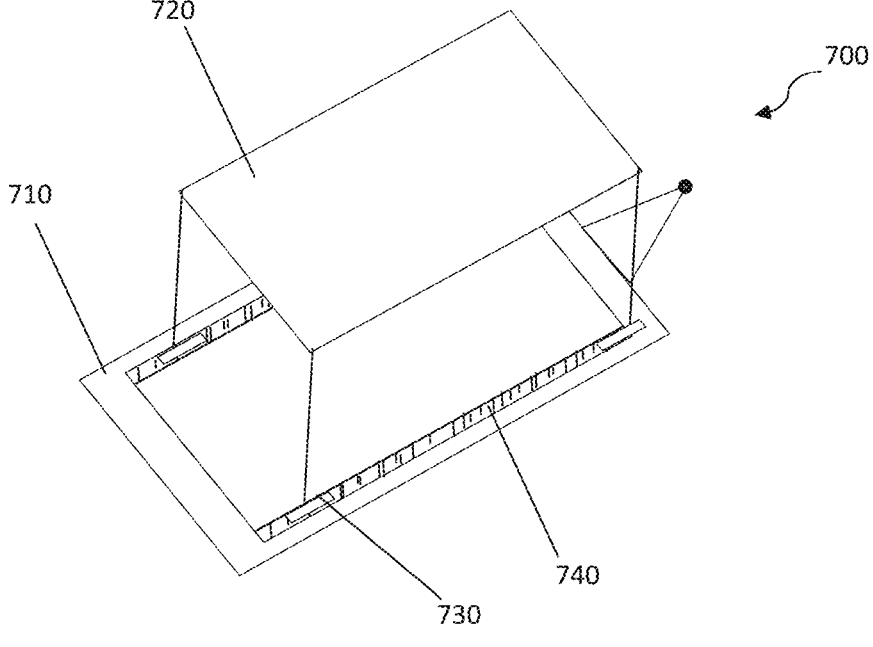
FIG. 7 illustrates a frame and an upper movably coupled to the upper, according to an embodiment.

FIG. 7 illustrates a self-balancing trailer 700, comprising an upper 720 that is movably coupled to a frame/chassis 710. The upper is configured to move fore or aft along frame 710 via any suitable mechanism, including for example, a rack and pinion or linear actuator 730 or other mechanical adjustment system to move the upper 720 along the frame 710 which can be coupled via rail 740.

In some embodiments, a system can be provided comprising one or more sensors configured to obtain sensor data associated with the trailer (e.g., the frame, the upper, items stored on/in the upper), and a controller comprising (a) one or more processors, and (b) a memory storing software instructions that, when executed by the one or more processors, cause the one or more processors to obtain the sensor data from the one or more sensors, identify an event associated with the load of a trailer based at least in part on the sensor data, and cause an adjustment of the trailer based at least in part on the sensor data. In some embodiments, the adjustment can comprise an adjustment to a position of the upper relative to the frame.

Some known trailers have a single central axle or two axles positioned close together at or near a mid-portion of the trailer (between the front and tail of the trailer). Having the axles/wheels at the mid-portion minimizes tire scrubbing during turns, and can allow the trailer to track better behind the tow vehicle. In an aspect of the disclosure, a trailer is provided comprising at least a first axle and a second axle that are positioned near the front and rear of the trailer, respectively. In some embodiments, a distance between a mid-portion of a first axis and a mid-portion of a second axis can comprise at least 50%, at least 60%, at least 70%, at least 80%, at least 85%, and/or at least 90% of a length of the trailer and/or chassis of the trailer. It is contemplated that this will have the effect of widening the fulcrum point (or viewed from another perspective, creating multiple fulcrum points, one at each axle). Such an approach can make it vastly easier to balance the load of the trailer and can greatly reduce the tongue weight on the tow vehicle, or even eliminate it completely which converts the tow vehicle to a lead vehicle since it is no longer supporting any of the trailer's weight. As the greater distance between the axles can dramatically increase tire scrubbing (e.g., at low speeds and higher steering angles), it is contemplated that the trailer can comprise a steerable trailer where the axles and/or wheels can be steered rather than having wheels that are always pointing straight ahead. In some embodiments, a steerable trailer comprises front and rear axles, each axle comprising and/or coupled to two wheels. It is contemplated that the front wheels, rear wheels, or all wheels of the trailer can be steerable. Steerable trailer wheels not only reduce scrubbing but can also reduce tire wear and noise while turning, potentially allowing the trailer to follow the exact same path as the tow/lead vehicle so the trailer does not cut corners or hop curbs because the trailer didn't follow the same radius/path as the tow/lead vehicle. This would allow a trailer to follow a vehicle through drive-throughs and/or other narrow spaces and/or execute tight corners. Further, it is contemplated that steerable trailer wheels can provide incredible stability, making it virtually impossible to roll the trailer or tow/lead vehicle, and can eliminate sway from cross winds or when passing vehicles, etc. Further, independently steerable wheels (front, rear, or both) can follow the correct arc for the turn they are making. For example, when making a U-turn, the outboard wheels travel much farther and along a much larger radius than the inboard wheels. Traditional steering mechanisms lock the steering wheels to each other which typically forces them to follow about the same radius, which causes the inboard tire to scrub. Similarly, with traditional steering the rear wheels follow a much different arc and trajectory than the front wheels, which can result in the rear of the vehicle running into or over objects the front wheels missed due to their different path. Additional benefits of moving the axles/wheels closer to the corners is improved approach, departure, and breakover angles which effectively increases ground clearance.

Some or all of the trailers described herein can comprise a height adjustable suspension. Known ways of adjusting the suspension height include air bags/springs, pneumatic springs, torsion bars. However, any suitable methods and mechanisms for adjusting the suspension height is contemplated herein. With a height adjustable suspension, the height of the front and/or rear axle/wheels could be adjusted to shift the load fore or aft. In embodiments, for example, where the axles/wheels are positioned and/or configured to be positioned closer to the front and rear of the trailer, the height adjustable suspension can be used to level and stabilize the trailer when it is stationary and being used. Such height adjustable suspension can eliminate the need for manual/electric/hydraulic jacks at the corners of a trailer to level and stabilize it. Such an embodiment, especially where one or more axles/wheels are steerable, can eliminate the need for a trailer jack wheel on the tongue of the trailer. Such an embodiment can also eliminate the need to rotate the trailer jack wheel up when towing and down when unhitching. Height adjustable suspensions and/or steerable wheels can also make it possible for the trailer to hitch and unhitch itself from the tow/lead vehicle.

In an aspect of the disclosure, a trailer is provided comprising a set of fluid storage tanks fluidly coupled to one another via a piping system. In some embodiments, one or more liquids can be moved from a first tank to one or more other tanks (e.g., to one or more tanks positioned fore, aft, port, or starboard relative to the first tank), and vice versa. Contemplated self-balancing trailers can comprise a plurality of fluid (e.g., water, and/or gray water, and/or black water, and/or fuel) tanks, and a piping system/plumbing with pumps connecting the plurality of tanks. The weight of the fluid (e.g., water) in the tanks can be used to dynamically balance the load of the trailer for various situations by pumping some of the fluid fore/aft and/or left/right to achieve a safer balance. The trailer could comprise and/or be coupled to a system configured to sense how the load is changing and pump water back and forth between the water tanks to help balance the load.

The piping system/plumbing can comprise one or more bidirectional pumps and one or more pipes connecting the tanks. For example, a first tank and a second tank can be coupled to one another via a single pipe (or multiple pipes), and a bidirectional pump can be configured to pump a liquid from the first tank to the second tank, and from the second tank to the first tank. Additionally or alternatively, all tanks (for example, four tanks front-starboard, front-port, rear-starboard, and rear-port) can be connected using a single pipe to form a "loop", and a set of valves can be opened and closed to determine which tank receives the fluid.

Figure 4:
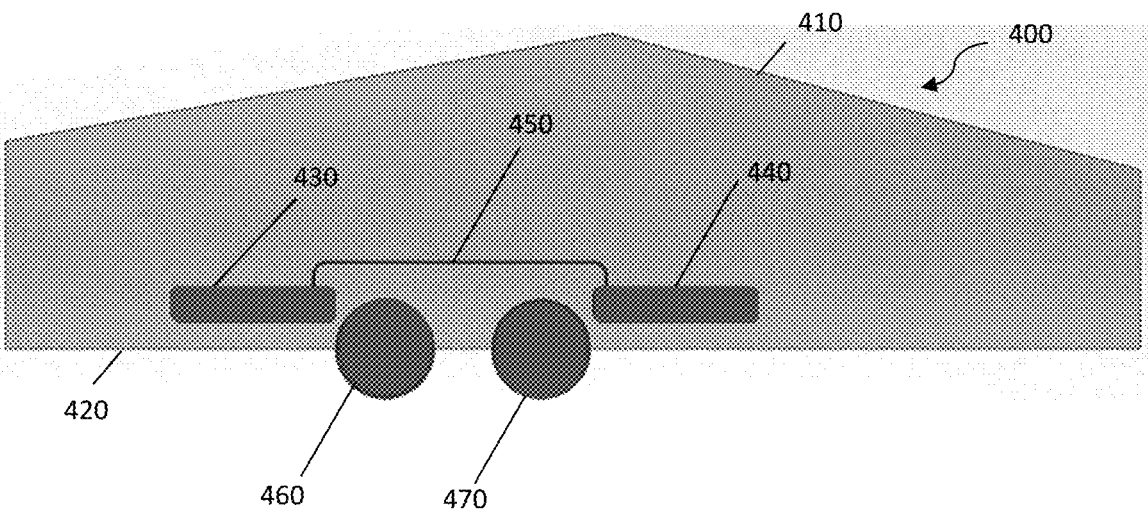
FIG. 4 illustrates a trailer with a load balancing system, according to an embodiment.

FIG. 4 illustrates a side view of trailer 400 comprising a front axle/wheels 470, rear axle/wheels 460, and a set of fluid storage tanks (rear water tanks 430 (left and right), front water tanks 440 (left and right), fluidly coupled to one another via a piping system 450 (plumbing with pumps connecting the tanks). The tanks and/or piping system can be coupled to any portion of the vehicle, including the upper 410 and/or the chassis 420.

In another aspect of the disclosure, it is contemplated that a trailer can comprise one or more battery packs. In some embodiments, the trailer is an electrically powered and/or electrically driven trailer with one or more large and heavy battery packs. In some embodiments, the batteries/cells can be moved fore or aft, and optionally port and/or starboard) within the battery pack. This movement can be accomplished with, for example, a rack and pinion, a linear actuator, a pneumatic cylinder, a hydraulic ram, and/or any other suitable mechanisms. Additionally or alternatively, the battery pack itself (whether structural or non-structural) could be moved fore/aft, and optionally port/starboard relative to at least one of the frame and an the upper to balance the load. It is contemplated that at least in part due to the high mass of the batteries, a small movement/adjustment of the battery and/or battery pack could have a significant effect on the trailer's balance.

The self-balancing trailers described herein can have one or more of the following benefits, among others: Load balancing; dynamic load balancing; when combined with a height adjustable suspension, eliminating the need for corner jacks to stabilize and level the trailer when it reaches its destination; effective increase the ground clearance, and in conjunction with a height adjustable suspension, can increase the ground clearance even more by adjusting one or more of an approach angle, a breakover angle, or departure angle; moving axles with steerable wheels can also make the trailer easier to park and maneuver; eliminating the need for a trailer jack at the front by the hitch, for example, because the trailer can be stable and adjust its height without it.

In some aspects, contemplated trailers can comprise steerable wheels. To avoid excessive wear to the tires, the wheels can incorporate steering geometry to provide a correct arc of travel and improved stability.

In an aspect of the disclosure, a system is providing comprising any of the trailers described herein, and one or more sensors positioned on the suspension, at or near the corners or the trailer and/or vehicle frame, and/or in any other suitable location(s) along the trailer, and configured to detect and/or communicate data associated with a trailer (e.g., a trailer load, a trailer balance, a trailer weight). The one or more sensors can be used in combination with an onboard (the trailer) computing device or remote computing device (e.g., a cell phone or cloud service) to interact with the load balancing system/trailer either wirelessly or wired to determine the loading, balance, weight, and other relevant factors, and to control load balancing processes and assure that it is operated safely. In some embodiments, sensor data collected via the one or more sensors can be communicated to a platform for processing.

System Overview

1.1 Infrastructure

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120, or may be entirely implemented on the loopback (e.g., localhost) interface. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases. In addition, communication between any of these systems, for example, platform 110, user systems 130, and/or external system 140, may be entirely implemented on the loopback (e.g., localhost) interface.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may comprise or be communicatively connected to a client application 132 and/or one or more local databases 134. While user system 130 and platform 110 are shown here as separate devices connected by a network 120. User system 130 may comprise an application 132 that may comprise one portion of a distributed cloud-based system that integrates with platform 110, for example, using a multi-tasking OS (e.g., Linux) and local only (localhost) network addresses.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, or may be entirely implemented on the loopback (e.g., localhost) interface, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, MongoDB™, and the like, including cloud-based databases and proprietary databases. Data may be sent to platform 110, for instance, using the well-known POST, GET, and PUT request supported by HTTP, via FTP, proprietary protocols, requests using data encryption via SSL (HTTPS requests), and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

While platform 110, user systems 130, and external systems 140 are shown as separate devices communicatively coupled by network 120, each of the devices shown as platform 110, user systems 130, and external systems 140 may be implemented on one or more devices, and/or one or more of platform 110, user systems 130, and external systems 140 may be implemented on a single device.

1.2 Example Processing Device

Figure 2:
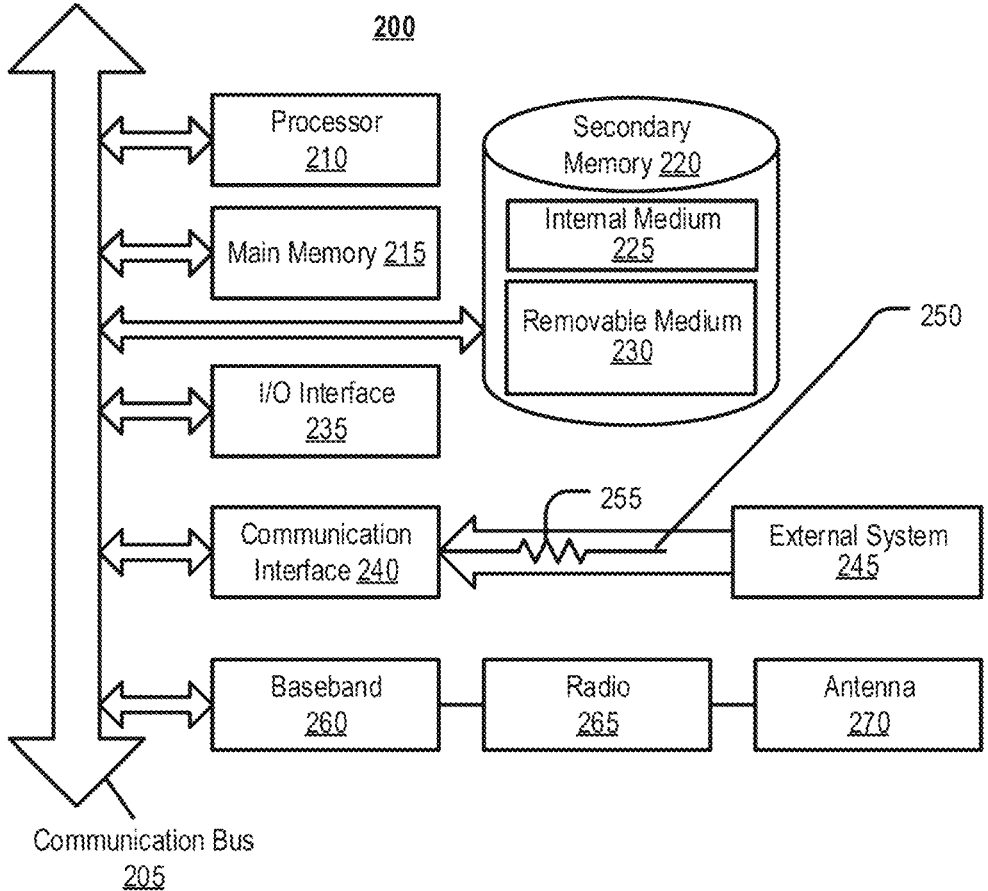
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

System 200 may comprise an I/O interface 235. In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components may comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

1. Process Overview

Embodiments of processes for load balancing systems and methods will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of sub-processes, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In some aspects, a system for balancing a load of a trailer is provided. The system can comprise a self-balancing trailer. The self-balancing trailer can comprise a first axle comprising a first set of wheels, a second axle comprising a second set of wheels, and wherein at least one of the first and second axles are configured to move (e.g., relative to a trailer frame and/or upper) based at least in part on at least one of a load of the trailer, a load of a portion of the trailer, a load distribution, and a change in a load distribution. In some aspects, one or more of the axles are configured to move in at least one of a forward and backward direction, as shown in FIG. 3. However, it should be appreciated that the movable axles can be configured to move in any suitable direction(s). In some aspects, one or more sets of wheels can be steerable, which can make the trailer easier to park and/or maneuver.

In some embodiments, it is contemplated that the battery pack of a vehicle can move forward or backwards mechanically and automatically to help provide and maintain good balance. Some contemplated self-balancing trailers can dynamically balance a load. A need for one or more corner jacks to stabilize and level the trailer when it reaches its destination can be eliminated, for example, when combined with a height adjustable suspension. In some aspects, the movable axles can advantageously increase the ground clearance. In some aspects, in conjunction with a height adjustable suspension, the movable axles can increase the ground clearance even more by adjusting one or more of an approach angle, a breakover angle, and departure angle. In some aspects, the trailers described herein can be stable and height adjustable without a need for a trailer jack at a front portion (by the hitch) or stabilizer jacks at each corner of the trailer.

Contemplated systems can also comprise a controller, comprising one or more processors, and a memory storing software instructions that, when executed by the one or more processors, cause the one or more processors to cause at least one of the axles to move (e.g., forward, rearward, sideways, diagonally, in a curved or linear manner) relative to at least one of the frame and/or upper. Additionally or alternatively, the software instructions, when executed by the one or more processors, can cause the one or more processors to cause a notification to be sent to a user system (or computing device) and displayed via a user interface of the user system. The user system can be, for example, a part of the tow vehicle coupled to the trailer, a part of the trailer, and/or a remote user system. In some aspects, at least one sensor is provided and configured to obtain sensor data associated with the trailer, for example, data associated with a load distribution of the trailer. In some aspects, the software instructions, when executed by the one or more processors, further cause the one or more processors to obtain sensor data from the at least one sensor.

The at least one sensor can comprise any suitable sensor(s), including, for example, cameras, video cameras, sound sensors, microphones, a weight sensor, a force sensor, a tilt sensor, or any other suitable sensors.

The sensor data can comprise any data associated with the trailer, a tow vehicle, and/or a surrounding. For example, sensor data can comprise, among other things, image data, video data, sound data, traffic data, road data (e.g., road bumps or curvatures), weight data, load data, force data, weight distribution data, load distribution data, force data associated with different parts of the trailer (e.g., data associated with a force upon a first axle or spring (or other component) coupled to the first axle, and data associated with a second force upon a second axle or spring (or other component) coupled to the second axle), weight data associated with different parts of the trailer (e.g., data associated with a weight upon a first axle or spring (or other component) coupled to the first axle, and data associated with a second weight upon a second axle or spring (or other component) coupled to the second axle), data associated with a road condition (e.g., bump) or an upcoming turn associated with a potential change in load, weight, load distribution, etc. associated with the trailer, and/or any other suitable data.

In some embodiments, the software instructions, when executed by the one or more processors, can cause the one or more processors to (a) receive the sensor data, (b) determine whether the sensor data is indicative of an unbalanced load, and (c) upon determining the sensor data is indicative of an unbalanced load, at least one of (1) cause one or more axles of the trailer to move relative to at least one of a frame and upper of the trailer, (2) cause one or more actuators coupled to one or more axles to adjust a position of the axle relative to the frame, and (3) transmit to at least one of a platform, an external system and a user system (e.g., a computing device), via a wired or wireless communication interface, at least one of the sensor data and a notification relating to the sensor data. As one non-limiting example, determining whether the sensor data is indicative of an unbalanced load can comprise comparing weight data associated with one portion of the trailer (e.g., a first axle) with weight data associated with another portion of the trailer (e.g., a second axle) and identifying that a greater weight is applied at one portion of the trailer, for example, the front axle. Based on determining there is a greater weight being applied to the front axle, the software instructions, when executed by the one or more processors, can cause the one or more processors to, for example, move a rear axle towards the front axle by a distance to achieve equal or substantially equal weight being applied to each of the front and rear axles. As another example, determining whether the sensor data is indicative of an unbalanced load can comprise comparing distance data indicative of a distance between a first sensor (and component it is attached to) and a predetermined point, for example, a frame portion directly above it, an upper portion directly above it, a ground directly beneath it, etc. and distance data indicative of a distance between a second sensor (and component it is attached to) and a second predetermined point, for example, a frame portion above the second sensor, an upper portion directly above the second sensor, a ground directly beneath the second sensor, etc.) and identifying that a greater weight is applied at one portion of the trailer, for example, the front axle, based on the comparison (e.g., sensor attached to the front axle is closer to the ground than a rear axle). Based on determining there is a greater weight being applied to the front axle, the software instructions, when executed by the one or more processors, can cause the one or more processors to, for example, move a rear axle towards the front axle by a distance to achieve equal or substantially equal weight being applied to each of the front and rear axles.

The notification(s) can be indicative of, for example, a need to balance a load of the trailer. In some embodiments, the software instructions, when executed by the one or more processors, can further cause the one or more processors to cause a controller to take an action (e.g., to turn a light of the trailer (e.g., brake light, flashing turn light) on and/or off by causing an activation of a light switch). For example, a switch associated with emergency flashing lights of the trailer can be activated based at least in part on the sensor data (e.g., sensor data associated with a road condition and/or a speed of the trailer).

In some aspects, the controller can comprise system 200 comprising one or more processors (e.g., processor 210) and memory (e.g., main memory 215, secondary memory 220) storing the software instructions. The one or more sensors can communicate with controller via, for example, I/O interface 235, external medium 245, and/or antenna 270. The controller can be a part of the trailer, and configured to control various components of the trailer.

In some aspects, the user system can comprise system 200. In some aspects, user system can communicate with controller directly (e.g., via Bluetooth, WiFi) with or without a network, for example, to transmit instructions to the controller to take an action (e.g., adjust an axle, pump fluid from one tank to another, adjust a position of a battery, adjust a position of an upper—for example, relative to the trailer frame). In some aspects, the controller can comprise external system 140, which can be coupled to platform 110 and/or user system 130 via a network.

In some aspects, the controller can be configured to communicate with one or more systems, for example one or more user systems 130 (e.g., a remote user system, a user system onboard a tow vehicle coupled to the trailer). In some aspects, artificial intelligence, deep learning and machine learning technology can be utilized to ensure appropriate actions are taken to re-balance an unbalanced load and/or preemptively make an adjustment (e.g., to the movable axle(s)) based on an expected shift in a load balance, and/or to activate a light (e.g., brake light, emergency flashing light) based on predicted conditions (e.g., road conditions, trailer speed). For example, it is contemplated that a user system and/or platform can obtain sensor data and other data from multiple trailers, vehicles, computing devices, sensors and systems, and machine learning can be used to study the data and recognize patterns and events associated with trailers.

In some aspects, the controller can be configured to receive the data from one or more sensors and/or a local and/or remote database, for example, via I/O interface 235, external medium 245 and/or antenna 270. In some aspects, the controller is configured to determine a trailer load is unbalanced based at least in part on the data from the one or more sensors. In some aspects, the controller is configured to determine an expected shift in a load of a trailer based at least in part on the sensor data and a query of a database storing, for example, sensor data (e.g., historic sensor data), event data, load data, load shift data, road data, tow vehicle data, driver data, navigation data, trailer data, traffic data, speed data, weight data, distribution data (e.g., weight/force distribution data), threshold data, suspension height data, historic data (e.g., historic sensor data), deflection of frame data, ride height data, correlation data, and/or any other suitable data, which can be gathered, for example, from and/or via the trailer and/or other trailers and/or vehicles and/or user systems and/or sensors. In some embodiments, determining the expected shift can comprise transmitting sensor data to a computing device having a memory storing a machine learning model, and receiving the indication of the event based at least in part on the sensor data and the machine learning model. In some embodiments, determining the expected shift can comprise transmitting sensor data to a computing device having access to one or more databases storing sensor data (e.g., historic sensor data), event data, load data, load shift data, road data, tow vehicle data, driver data, navigation data, trailer data, traffic data, speed data, weight data, distribution data (e.g., weight/force distribution data), threshold data, suspension height data, historic data (e.g., historic sensor data), deflection of frame data, ride height data, correlation data, and/or any other suitable data, and receiving the indication of the event based at least in part on the sensor data and the sensor data (e.g., historic sensor data), event data, load data, load shift data, road data, tow vehicle data, driver data, navigation data, trailer data, traffic data, speed data, weight data, distribution data (e.g., weight/force distribution data), threshold data, suspension height data, historic data (e.g., historic sensor data), deflection of frame data, ride height data, correlation data, and/or any other suitable data.

Figure 5:
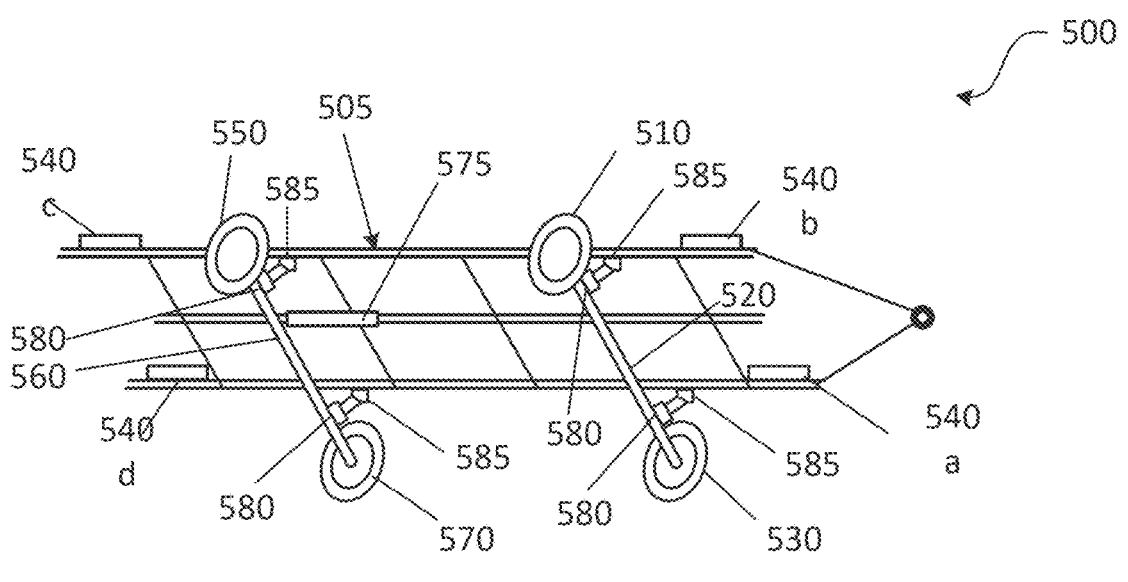
FIG. 5 illustrates a frame, axis, suspension system components, and sensors of a load balancing system, according to an embodiment.

FIG. 5 illustrates components of a trailer including sensors of a load balancing system as described herein. Trailer 500 comprises a frame 505, a first axle 520 (here a front axle) coupled to and/or comprising first wheel 510 and second wheel 530, the first axle 520 coupled to the frame 505 via first and second suspension system components 515, 525 (e.g., leaf spring, coil spring, shock absorber, rod, damper, damper spring), a second axle 560 (here a rear axle) coupled to and/or comprising third wheel 550 and fourth wheel 570, the second axle coupled to the frame 505 via third and fourth suspension system components 555, 565, and a plurality of sensors 540 a, 540 b, 540 c, 540 d, which can be coupled to the corners of a frame, the axles, the suspension system (e.g., components 515, 525, 555, 565), or any other suitable portion of the trailer, including the upper. In some embodiments, the sensors can comprise one or more sensors of any of the load balancing systems described herein. In some embodiments, one or both of the first axle 520 and second axle 560 are movably coupled to the frame 505. For example, first axle 520 can be directly or indirectly (e.g., via a spring of damper) coupled to actuator 575 (e.g., a linear actuator). The actuator 575 can be attached and/or coupled to a portion of frame 505, and the axle and/or a component of the suspension system coupled to the axle can be coupled to a rod or shaft or carriage that slides in and out of and/or along an actuator body of actuator 575. Due to their inherent design, linear actuators can hold a position so the carriage and whatever is attached to it will not change position. In some embodiments, components 515, 525, 555, and 565 (e.g., leaf springs, coil springs) can be attached and/or coupled to the first axle 520 and the second axle 560 by a first bracket 580, and attached and/or coupled to the frame 505 via a second bracket 585.

In some aspects, a load balancing system is provided, for example, for a trailer. The load balancing system can comprise a first fluid tank fluidly coupled to a second fluid tank. In some embodiments, the first fluid tank is fluidly coupled to the second fluid tank via at least one pipe and/or a set of pipes. One or more pumps can be provided and configured to pump fluid from the first fluid tank to the second fluid tank via the first set of pipes and/or from the second fluid tank to the first fluid tank via a set of pipes (which can be the same or different from the first set of pipes). A third fluid tank fluidly coupled to a fourth fluid tank may be provided in some contemplated systems. A second set of pipes can connect the third fluid tank to the fourth fluid tank, and a second pump can be configured to pump fluid from the third fluid tank to the fourth fluid tank via the second set of pipes, and/or from the fourth fluid tank to the third fluid tank via a set of pipes (which can be the same or different from the second set of pipes).

In some aspects, a set of pipes can connect the first fluid tank to the third fluid tank, the first fluid tank to the fourth fluid tank, the third fluid tank to the second fluid tank, or the fourth fluid tank to the second fluid tank. One or more pumps can be configured to pump fluid from any of the tanks to any of the other tanks. In some aspects, contemplated systems can comprise any suitable number of fluid tanks, pipes, pumps, and any plumbing components.

In some aspects, any of the load balancing systems described herein can further comprise one or more sensors configured to detect sensor data associated with a load (e.g., a change in a load and/or a load distribution), and a controller, comprising one or more processors, and a memory storing software instructions that, when executed by the one or more processors, cause the one or more processors to obtain the sensor data from the one or more sensors, detect at least one of an unbalanced load and a change in a load associated with the trailer based at least in part on the sensor data, and cause at least one of the pumps to pump fluid from at least one fluid tank to at least one other fluid tank based at least in part on the sensor data. For example, the software instructions, when executed by the one or more processors, can cause the one or more processors to cause the first pump to pump fluid from the first fluid tank to the second fluid tank. As another example, the software instructions, when executed by the one or more processors, can cause the one or more processors to cause the second pump to pump fluid from the third fluid tank to the fourth fluid tank. As yet another example, the software instructions, when executed by the one or more processors, can cause the one or more processors to cause the a pump to pump fluid from the one fluid tank to two or more different fluid tanks. As yet another example, the software instructions, when executed by the one or more processors, can cause the one or more processors to send a notification (e.g., via text, email, sound, alert, display of a computing device) relating to the sensor data and/or the trailer (e.g., an unbalanced load).

As one non-limiting example, detecting an unbalanced load can comprise comparing weight data associated with one portion of the trailer (e.g., a first tank) with weight data associated with another portion of the trailer (e.g., a third tank) and identifying that a greater weight is applied at one portion of the trailer, for example, the first tank. Based on determining there is a greater weight being applied to the first tank, the software instructions, when executed by the one or more processors, can cause the one or more processors to, for example, cause a fluid from one or more tanks to be pumped to one or more other tanks to account for the greater weight being applied to the portion of the trailer.

In some aspects, the controller can comprise system 200. In some aspects, the controller can be configured to communicate with one or more systems via wired and/or wireless methods, for example one or more computing devices. In some aspects, the computing device can comprise system 200. In some aspects, the controller can be configured to receive the data from one or more sensors and/or a local and/or remote database, for example, via I/O interface 235, external medium 245 and/or antenna 270. In some aspects, the controller is configured to determine a trailer load is unbalanced based at least in part on the data from the one or more sensors. In some aspects, the controller is configured to determine an expected shift in a load of a trailer based at least in part on the sensor data and a query of a database storing, for example, sensor data (e.g., historic sensor data), event data, load data, load shift data, road data, tow vehicle data, driver data, navigation data, trailer data, traffic data, tank fill data, liquid distribution data, speed data, weight data, distribution data (e.g., weight/force distribution data), threshold data, suspension height data, deflection of frame data, ride height data, correlation data (e.g., liquid and weight correlation data), and/or any other suitable data, which can be gathered, for example, from and/or via the trailer and/or other trailers and/or vehicles and/or user systems and/or sensors. In some embodiments, determining the expected shift can comprise transmitting sensor data to a computing device having a memory storing a machine learning model, and receiving the indication of the event based at least in part on the sensor data and the machine learning model. In some embodiments, determining the expected shift can comprise transmitting sensor data to a computing device having access to one or more databases storing sensor data sensor data (e.g., historic sensor data), event data, load data, load shift data, road data, tow vehicle data, driver data, navigation data, trailer data, traffic data, tank fill data, liquid distribution data, speed data, weight data, distribution data (e.g., weight/force distribution data), threshold data, suspension height data, deflection of frame data, ride height data, correlation data (e.g., liquid and weight correlation data), and/or any other suitable data, and receiving the indication of the event based at least in part on the sensor data and the data stored in the one or more databases.

It should be appreciated that with some contemplated trailers and systems, the weight of the fluid (e.g., water) in the tanks can be used to dynamically balance the load of the trailer for various situations by pumping some of the fluid fore/aft and left/right to achieve a safer balance. The trailer could be configured to sense how the load on a trailer and/or portions thereof is changing and pump water back and forth between the water tanks to help balance the load.

Figure 6:
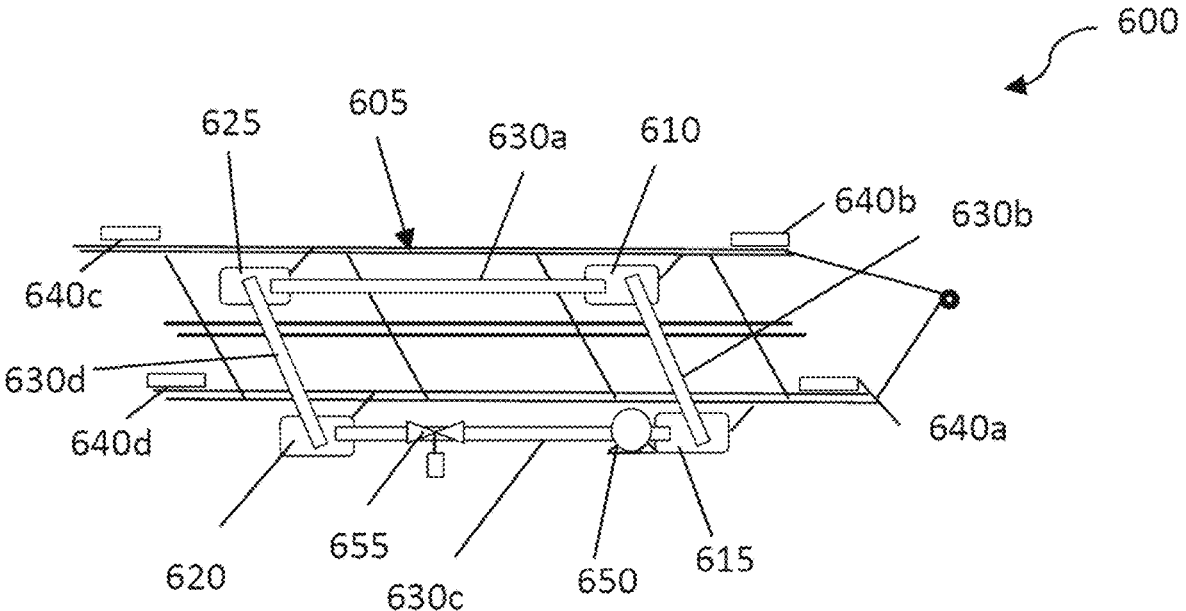
FIG. 6 illustrates a frame, pipe system, fluid containers, and sensors of a load balancing system, according to an embodiment.

FIG. 6 illustrates components of a trailer including sensors of a load balancing system as described herein. Trailer 600 comprises frame 605, and a set of fluid tanks (a first fluid tank 610, a second fluid tank 615, a third fluid tank 620, and a fourth fluid tank 625) coupled to the frame. Trailer 600 further comprises a piping system that includes a first pipe 630$a$ fluidly coupling the fourth fluid tank to the first fluid tank, a second pipe 630$b$ coupling the first fluid tank to the second fluid tank, a third pipe 630$c$ coupling the second fluid tank to the third fluid tank, and a fourth pipe 630$d$ coupling the third fluid tank to the fourth fluid tank. A set of sensors (e.g., 640$a$, 640$b$, 640$c$, and 640$d$) are provided and coupled to at least one of the frame, the fluid tanks, the piping system, the corners of the frame, the axles, the suspension system, or any other suitable portion of the trailer, including the upper. The piping system can comprise any suitable number of pipes fluidly coupling any suitable number of tanks coupled to frame 605. Any suitable number of fluid pumps (e.g., 650) may be provided to pump a fluid from one tank to one or more other tanks (and vice versa). The piping system can comprise any suitable number of fluid valves 655 that can be adjusted to adjust a flow of a fluid between the tanks. In some embodiments, the sensors can comprise one or more sensors of any of the load balancing systems described herein. The sensors may comprise any suitable sensor configured to detect sensor data associated with trailer 600 and/or an environment around the trailer. For example, the sensors can comprise weight sensors and/or force sensors configured to obtain data associated with a load distribution.

EXAMPLES OF NON-LIMITING EMBODIMENTS

Embodiment 1. A self-balancing trailer, comprising a first movable axle comprising a first set of wheels, a second movable axle comprising a second set of wheels, wherein the first and second moving axles are configured to move based at least in part on a load of the trailer or portion thereof.

Embodiment 2. The self-balancing trailer of embodiment 1, wherein the first set of wheels are steerable.

Embodiment 3. The self-balancing trailer of any of embodiments 1-2, wherein the first and second moving axles are configured to move at least in part on a load distribution.

Embodiment 4. The self-balancing trailer of any of embodiments 1-3, wherein the first and second moving axles are configured to move at least in part on a change in a load distribution.

Embodiment 5. The self-balancing trailer of any of embodiments 1-4, wherein at least one of the first and second movable axles is movable in a forward and backward direction.

Embodiment 6. The self-balancing trailer of any of embodiments 1-5, further comprising a detector comprising at least one sensor configured to detect a change in a load, one or more processors, and a memory storing software instructions that, when executed by the one or more processors, cause the one or more processors to: obtain the sensor data from the detector, and cause at least one of the first movable axle and the second movable axle to move based at least in part on the sensor data.

Embodiment 7. The self-balancing trailer of any of embodiments 1-6, wherein the first and second movable axles are movable coupled to a frame of the trailer.

Embodiment 8. The self-balancing trailer of any of embodiments 1-7, wherein the first and second movable axles are movable coupled to a frame of the trailer via a suspension system.

Embodiment 9. The self-balancing trailer of any of embodiments 1-8, wherein the first movable axle is coupled to a linear actuator configured to move the first movable axle along a linear path.

Embodiment 10. A load balancing system, comprising a first fluid tank fluidly coupled to a second fluid tank via a set of pipes.

Embodiment 11. The load balancing system of embodiment 10, wherein the set of pipes comprises a single pipe.

Embodiment 12. The load balancing system of any of embodiments 10-11, further comprising a set of pipes, and a pump configured to pump fluid from the first fluid tank to the second fluid tank via the first set of pipes.

Embodiment 13. The load balancing system of any of embodiments 10-12, further comprising a third fluid tank fluidly coupled to a fourth fluid tank.

Embodiment 14. The load balancing system of any of embodiments 10-13, further comprising a second set of pipes and a second pump configured to pump fluid from the third fluid tank to the fourth fluid tank via the second set of pipes.

Embodiment 15. The load balancing system of any of embodiments 10-14, further comprising a detector comprising at least one sensor configured to detect a change in a load, one or more processors, and a memory storing software instructions that, when executed by the one or more processors, cause the one or more processors to: obtain the sensor data from the detector, and at least one of cause the first pump to pump fluid from the first fluid tank to the second fluid tank based at least in part on the sensor data, and send a notification related to the sensor data.

Embodiment 16. The load balancing system of any of embodiments 10-15, wherein the software instructions, when executed by the one or more processors, cause the one or more processors to cause the second pump to pump fluid from the third fluid tank to the fourth fluid tank based at least in part on the sensor data.

Embodiment 17. A load balancing system, comprising first, second, third, and fourth fluid tanks fluidly coupled to one another via a set of pipes and a set of pumps.

Embodiment 18. A self-balancing trailer, comprising a load balancing system comprising first, second, third, and fourth fluid tanks fluidly coupled to one another via a set of pipes and a set of pumps.

Embodiment 19. A trailer, comprising a frame, a suspension system configured to support the frame on a set of axles comprising a first axle, and wherein the first axle is movably coupled to the frame.

Embodiment 20. The trailer of embodiment 19, wherein the set of axles further a second axle coupled to the frame.

Embodiment 21. The trailer of any of embodiments 19-20, wherein the second axle is movably coupled to the frame.

Embodiment 22. The trailer of any of embodiments 19-21, wherein, the first axle is configured to move at least 1 foot, at least 2 feet, at least 3 feet, at least 4 feet, or even at least 5 feet or more in any suitable direction (e.g., forward, rearward, sideways to left or right, diagonally) is a straight or curved manner relative to the frame.

Embodiment 23. The trailer of any of embodiments 19-22, wherein the first axle and second axle and coupled to the frame such that a distance between a mid-point of the first axle and a mid-point of the second axle can be modified by at least 1 foot, at least 2 feet, at least 3 feet, at least 4 feet, or even at least 5 feet or more in any suitable direction.

Embodiment 24. The trailer of any of embodiments 19-23, wherein the distance can be modified while the trailer is coupled to a moving tow vehicle.

Embodiment 25. The trailer of any of embodiments 19-24, wherein the distance can be modified while the trailer is parked.

Embodiment 26. The trailer of any of embodiments 19-25, wherein the suspension system comprises a first spring, wherein the first axle is movably coupled to the frame via the first spring, wherein a first portion of the first spring is coupled to the first axle via a first bracket, and wherein the second portion of the first spring is coupled to a second bracket that is movably coupled to the frame.

Embodiment 27. The trailer of any of embodiments 19-26, wherein the trailer further comprises an upper sized and dimensioned to support cargo, and wherein the first axle is configured to move based at least in part on a distribution of a weight of the cargo on the first and second axles.

Embodiment 28. The trailer of any of embodiments 19-27, wherein an actuator is coupled to the frame and the first axle, and configured to move the first axle relative to the frame.

Embodiment 29. The trailer of any of embodiments 19-28, wherein a second actuator is coupled to the frame and the second axle, and configured to move the second axle relative to the frame.

Embodiment 30. The trailer of any of embodiments 19-29, comprising any suitable number of actuators configured to move any suitable number of axles and/or wheels, wherein the actuator comprises any suitable actuator for moving one component relative to another component, including, for example, pneumatic actuators, hydraulic actuators, electric actuators, and linear actuators.

Embodiment 31. The trailer of any of embodiments 19-30, wherein the first axle is coupled to first and second wheels, and wherein the first and second wheels are steerable.

Embodiment 32. The trailer of any of embodiments 19-31, wherein the first and second wheels are independently steerable.

Embodiment 33. The trailer of any of embodiments 19-32, wherein the second axle is coupled to two wheels, and wherein the two wheels are steerable.

Embodiment 34. The trailer of any of embodiments 19-33, wherein the wheels are independently steerable.

Embodiment 35. The trailer of any of embodiments 19-34, wherein the first and second axles are moving axles (relative to the frame) and are configured to move relative to the frame based at least in part on a change in a load distribution.

Embodiment 38. A trailer, comprising a frame, a suspension system configured to support the frame on a set of wheels comprising a first, second and third wheel, and wherein at least the first wheel is movably coupled to the frame.

Embodiment 39. The trailer of embodiment 38, wherein the second wheel is movably coupled to the frame.

Embodiment 40. The trailer of any of embodiments 38-39, wherein the third wheel is movably coupled to the frame.

Embodiment 41. The trailer of any of embodiments 38-40, wherein at least one of the first, second, and third wheels is configured to move at least 1 foot, at least 2 feet, at least 3 feet, at least 4 feet, or even at least 5 feet or more in any suitable direction (e.g., forward, rearward, sideways to left or right, diagonally) is a straight or curved manner relative to the frame.

Embodiment 42. The trailer of any of embodiments 38-41, wherein an actuator is coupled to the frame and the first wheel, and configured to move the first wheel relative to the frame.

Embodiment 43. The trailer of any of embodiments 38-42, wherein a second actuator is coupled to the frame and the second wheel, and configured to move the second wheel relative to the frame.

Embodiment 44. The trailer of any of embodiments 38-43, wherein a third actuator is coupled to the frame and the third wheel, and configured to move the third wheel relative to the frame.

Embodiment 45. The trailer of any of embodiments 38-44, wherein the trailer comprises between 1-20 actuators and between 1-20 wheels.

Embodiment 46. The trailer of any of embodiments 38-45, wherein the actuator comprises any suitable actuator for moving one component relative to another component is contemplated, including, for example, pneumatic actuators, hydraulic actuators, electric actuators, and linear actuators.

Embodiment 47. The trailer of any of embodiments 38-46, wherein the first, second and/or third wheels are configured to move relative to the frame based at least in part on a change in a load distribution.

Embodiment 48. A load balancing system, comprising any of the trailers of embodiments 1-9, 19-47, and 71-73, one or more sensors coupled to the trailer and configured to detect sensor data associated with the trailer, and a controller comprising one or more processors, and a memory storing software instructions that, when executed by the one or more processors, cause the one or more processors to obtain the sensor data from the one or more sensors, identify at least one of an unbalanced load and a change in a load associated with the trailer based at least in part on the sensor data, and at least one of cause an adjustment of the trailer based at least in part on the sensor data, and send a notification based at least in part on the sensor data.

Embodiment 49. The load balancing system of embodiment 48, wherein causing an adjustment comprises causing at least one actuator to move at least one of the first axle and the second axle relative to the frame based at least in part on the sensor data.

Embodiment 50. The load balancing system of embodiment 48, wherein causing an adjustment comprises causing at least one actuator to move at least one wheel of a set of wheels of the trailer relative to the frame based at least in part on the sensor data.

Embodiment 51. A trailer comprising a frame, a piping system coupled to the frame, and a first fluid tank fluidly coupled to a second fluid tank via at least a first pipe of the piping system.

Embodiment 52. The trailer of embodiment 51, wherein the piping system comprises a first pump configured to pump a first fluid from the first fluid tank to the second fluid tank via at least the first pipe.

Embodiment 53. The trailer of any of embodiments 51-52, wherein the first pump is further configured to pump a second fluid from the second fluid tank to the first fluid tank via at least the first pipe.

Embodiment 54. The trailer of any of embodiments 51-53, wherein the trailer further comprises a third fluid tank fluidly coupled to a fourth fluid tank via at least a second pipe of the piping system.

Embodiment 55. The trailer of any of embodiments 50-54, wherein a second pump is configured to pump a third fluid from the third tank to the fourth tank via at least the second pipe.

Embodiment 56. The trailer of any of embodiments 50-55, wherein the second pump is configured to pump a fourth fluid from the fourth tank to the third tank via at least the second pipe.

Embodiment 57. The trailer of any of embodiments 51-56, wherein the piping system can comprise any suitable number of pipes, pumps, valves, and/or other components. In some embodiments, multiple piping systems can be provided.

Embodiment 58. The trailer of any of embodiments 51-57, wherein any suitable number of fluid tanks can be provided, and each fluid tank can be fluidly coupled to one, two, or several fluid tanks via one or more pipes of a piping system.

Embodiment 59. The trailer of any of embodiments 51-58, wherein a tank can be coupled to two or more other tanks, and a pump can pump fluid from the first tank to the two or more other tanks (sequentially—for example, with an adjustment of valves; or at the same time).

Embodiment 60. A load balancing system, comprising any of the trailers of embodiments 51-59, and 71-73, one or more sensors coupled to the trailer and configured to detect sensor data associated with the trailer, and a controller comprising one or more processors, and a memory storing software instructions that, when executed by the one or more processors, cause the one or more processors to obtain the sensor data from the one or more sensors, identify and change in a load associated with the trailer based at least in part on the sensor data, and at least one of cause an adjustment related to the trailer, and send a notification based at least in part on the sensor data.

Embodiment 61. The load balancing system of embodiment 60, wherein causing an adjustment comprises causing an adjustment relating to fluid distribution among the first, second, third, and/or fourth fluid tanks of the trailer.

Embodiment 62. The load balancing system of any of embodiments 60-61, wherein causing an adjustment comprises causing a pump to pump fluid from the first fluid tank to the second fluid tank based at least in part on the sensor data.

Embodiment 63. The load balancing system of any of embodiments 60-62, wherein causing an adjustment comprises causing a pump to pump fluid from the second fluid tank to the first fluid tank based at least in part on the sensor data.

Embodiment 64. The load balancing system of any of embodiments 60-63, wherein causing an adjustment comprises causing a pump to pump fluid from the third fluid tank to the fourth fluid tank based at least in part on the sensor data.

Embodiment 65. The load balancing system of any of embodiments 60-64, wherein causing an adjustment comprises causing a pump to pump fluid from the fourth fluid tank to the third fluid tank based at least in part on the sensor data.

Embodiment 66. A load balancing system for a trailer having a piping system including a first pump and a first pipe fluidly coupling a first fluid tank and a second fluid tank, comprising at least one sensor configured to detect sensor data associated with at least one of a load, a weight, a tension, a compression and a pressure associated with the trailer, a wired or wireless interface, and at least one processor configured to perform instructions, the instructions configured to cause the at least one processor to receive the sensor data, determine whether the sensor data is indicative of an unbalanced load, and upon determining the sensor data is indicative of the unbalanced load, at least one of: cause at least one pump to pump a first fluid from one tank to at least one other tank (e.g., the first tank to the second tank), transmit to at least one of a platform, an external system and a user system, via the communication interface, at least one of the sensor data and a notification associated with the sensor data (e.g., an alert notifying a driver of a tow vehicle of an unbalanced and/or dangerous load distribution), and/or cause a fluid valve coupled to at least one pipe to adjust (e.g., open, close, loosen, tighten).

Embodiment 67. The load balancing system of embodiment 66, wherein the trailer comprises any of the trailers of embodiments 51-59, and 71-73.

Embodiment 68. A load balancing system for a trailer having a frame, a suspension system configured to support the frame on a set of axles comprising a first axle movably coupled to the frame via an actuator, the system comprising at least one sensor configured to detect sensor data associated with at least one of a load, a weight, a tension, a compression and a pressure associated with the trailer, a wired or wireless communication interface, and at least one processor configured to perform instructions, the instructions configured to cause the at least one processor to: receive the sensor data, determine whether the sensor data is indicative of an unbalanced load, upon determining the sensor data is indicative of the unbalanced load, at least one of: cause an axle to move relative to the frame, cause an actuator to move an axle relative to the frame, and transmit to at least one of a platform, an external system and a user system, via a communication interface, at least one of the sensor data and a notification associated with the sensor data.

Embodiment 69. The load balancing system of embodiment 68, wherein the trailer comprises any of the trailers of embodiments 1-9, 19-47, and 71-73.

Embodiment 70. The load balancing system of any of embodiments 66-69, wherein the at least one sensor comprises at least one of a force sensor and a weight sensor.

Embodiment 71. The trailer of any of embodiments 51-60, further comprising a first movable axle comprising a first set of wheels, a second movable axle comprising a second set of wheels, wherein the first and second moving axles are configured to move based at least in part on a load of the trailer or portion thereof.

Embodiment 72. The trailer of any of embodiments 19-47, further comprising a piping system coupled to the frame, and a first fluid tank fluidly coupled to a second fluid tank via at least a first pipe of the piping system.

Embodiment 73. The trailer of embodiment 72, wherein the piping system comprises a first pump configured to pump a first fluid from the first fluid tank to the second fluid tank via at least the first pipe.

Embodiment 74. A load balancing system for a trailer, comprising one or more sensors configured to detect sensor data associated with a weight, load and/or force distribution on a trailer and/or component(s) thereof, Thus, specific examples of load balancing systems and methods, load balancing systems and methods comprising moving axles, and self-balancing trailers have been disclosed. The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The illustrations may include exaggerated dimensions and graphical representation to better illustrate the referenced items shown, and are not considered limiting unless expressly stated as such.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a," "an," and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Certain numerical values and ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Groupings of alternative elements or embodiments of the disclosure herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A trailer, comprising:
a frame;
a suspension system configured to support the frame on a set of axles comprising a first axle and a second axle;
   wherein the first axle and second axle are movably coupled to the frame;
   one or more sensors coupled to the frame and are configured to detect sensor data associated with the trailer, wherein the sensor data comprise one or more of weight data, weight distribution data, load distribution data, or force distribution data; and a controller, wherein the controller comprises:

one or more processors; and a memory storing software instructions that, when executed by the one or more processors, cause the one or more processors to:

obtain the sensor data from the one or more sensors;

identify at least one of an unbalanced load and a change in a load associated with the trailer based at least in part on the sensor data; and cause an actuator to move at least the first axle side-to-side relative to the frame based at least in part on the sensor data; and an upper sized and dimensioned to support cargo, and wherein the first axle is configured to move based at least in part on a distribution of a weight of the cargo on the first and second axles, wherein the upper is movably coupled to the frame, wherein the one or more processors cause a second actuator to move the upper relative to the frame based at least in part on the sensor data.

2. The trailer of claim 1, wherein the first axel is configured to move at least 1 foot in a first direction relative to the frame.

3. The trailer of claim 1, wherein the first axel is configured to move at least 2 feet in a first direction relative to the frame.

4. The trailer of claim 1, wherein the first axle and the second axle are coupled to the frame such that a distance between a mid-point of the first axle and a mid-point of the second axle can be modified by at least 1 foot.

5. The trailer of claim 4, wherein the distance can be modified while the trailer is coupled to a moving tow vehicle.

6. The trailer of claim 1, wherein the suspension system comprises a first spring, wherein the first axle is movably coupled to the frame via the first spring, wherein a first portion of the first spring is coupled to the first axle via a first bracket, and wherein a second portion of the first spring is coupled to a second bracket that is movably coupled to the frame.

7. The trailer of claim 1, further comprising an actuator coupled to the frame and the first axle, wherein the actuator is configured to move the first axle relative to the frame.

8. The trailer of claim 1, wherein the first axle is coupled to first and second wheels, and wherein the first and second wheels are steerable.

9. The trailer of claim 1, wherein the first and second moving axles are configured to move forward or backward relative to the frame based at least in part on a change in a load distribution.

10. A load balancing system, comprising:

a trailer, comprising:

a frame, a suspension system configured to support the frame on a set of axles comprising a first axle;

an upper that is movably coupled to the frame; and wherein the first axle is movably coupled to the frame;

one or more sensors coupled to the trailer, and configured to detect sensor data associated with the trailer, wherein the sensor data comprise one or more of weight data, weight distribution data, load distribution data, or force distribution data; and a controller, wherein the controller comprises:

one or more processors; and a memory storing software instructions that, when executed by the one or more processors, cause the one or more processors to:

obtain the sensor data from the one or more sensors;

identify at least one of an unbalanced load and a change in a load associated with the trailer based at least in part on the sensor data;

cause a first actuator to move the first axle relative to the frame based at least in part on the sensor date; and cause a second actuator to move the upper relative to the frame based at least in part on the sensor data.

11. A trailer, comprising:

a frame;

a suspension system configured to support the frame on a set of wheels comprising a first, second and third wheel;

wherein at least the first wheel is movably coupled to the frame;

one or more sensors configured to detect sensor data associated with the trailer, wherein the sensor data comprise one or more of weight data, weight distribution data, or force distribution data; and a controller, wherein the controller comprises:

one or more processors; and a memory storing software instructions that, when executed by the one or more processors, cause the one or more processors to:

obtain the sensor data from the one or more sensors;

identify at least one of an unbalanced weight load and a change in a load associated with the trailer based at least in part on the sensor data; and cause an actuator to diagonally move at least the first wheel relative to the frame based at least in part on the sensor data.

* * * * *